US009021806B2

(12) United States Patent
Kuhlbach et al.

(10) Patent No.: US 9,021,806 B2
(45) Date of Patent: *May 5, 2015

(54) SUPERCHARGED INTERNAL COMBUSTION ENGINE HAVING TWO TURBINES, AND METHOD FOR OPERATING AN INTERNAL COMBUSTION ENGINE OF SAID TYPE

(75) Inventors: Kai Sebastian Kuhlbach, Bergisch Gladbach (DE); Norbert Andreas Schorn, Aachen (DE); Carsten Weber, Leverkusen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 271 days.

This patent is subject to a terminal disclaimer.

(21) Appl. No.: 13/565,361

(22) Filed: Aug. 2, 2012

(65) Prior Publication Data

US 2013/0031901 A1 Feb. 7, 2013

(30) Foreign Application Priority Data

Aug. 3, 2011 (EP) .................................... 11176370

(51) Int. Cl.
*F02B 33/44* (2006.01)
*F02B 29/04* (2006.01)
*F16K 1/16* (2006.01)
(Continued)

(52) U.S. Cl.
CPC ............... *F02B 37/013* (2013.01); *F02F 1/243* (2013.01); *F02F 1/40* (2013.01); *F02B 37/004* (2013.01); *F02B 37/18* (2013.01); *F02B 37/183* (2013.01); *F02B 39/005* (2013.01); *Y02T 10/144* (2013.01)

(58) Field of Classification Search
CPC ...... F02B 37/004; F02B 37/013; F02B 37/16; F02B 37/193; F02B 39/005; F02F 1/40; Y02T 10/144
USPC .................... 60/612, 598, 610, 599; 251/298; 417/406–409
See application file for complete search history.

(56) References Cited

U.S. PATENT DOCUMENTS 4,784,586 A * 11/1988 Ho ................................. 417/407
4,930,315 A * 6/1990 Kanesaka ....................... 60/600
(Continued)

FOREIGN PATENT DOCUMENTS

DE 102007017973 A1 1/2008
DE 102008011257 A1 9/2009
(Continued)

*Primary Examiner* — Thai Ba Trieu
*Assistant Examiner* — Deming Wan
(74) *Attorney, Agent, or Firm* — Julia Voutyras; Alleman Hall McCoy Russell & Tuttle LLP

(57) ABSTRACT

Embodiments for a supercharged engine are presented. In one example, a supercharged engine includes a cylinder head having at least two cylinders, each cylinder having at least one outlet opening for discharging exhaust gases and each outlet opening being adjoined by an exhaust line, with exhaust lines of at least two cylinders merging to form an overall exhaust line within the cylinder head so as to form an integrated exhaust manifold, at least two turbines arranged in series, the two turbines being of different size and arranged downstream of the exhaust manifold in the overall exhaust line, a distributor housing in which the overall exhaust line downstream of the manifold enters into and leads through to a small turbine of the two turbines, and a first turbine housing which accommodates the small turbine including at least one coolant jacket in order to form a liquid cooling arrangement.

15 Claims, 4 Drawing Sheets

(51) Int. Cl.
*F02B 37/013* (2006.01)
*F02F 1/24* (2006.01)
*F02F 1/40* (2006.01)
*F02B 37/00* (2006.01)
*F02B 37/18* (2006.01)
*F02B 39/00* (2006.01)

(56) References Cited

U.S. PATENT DOCUMENTS

| | | | |
|---|---|---|---|
| 5,340,286 A * | 8/1994 | Kanigowski | 417/407 |
| 7,360,362 B2 * | 4/2008 | Nicolle et al. | 60/612 |
| 2004/0040300 A1 * | 3/2004 | Klingel | 60/612 |
| 2007/0169479 A1 | 7/2007 | Nicolle et al. | |
| 2009/0014674 A1 * | 1/2009 | Grissom et al. | 251/298 |
| 2010/0040467 A1 * | 2/2010 | Mudel | 415/214.1 |
| 2010/0095671 A1 * | 4/2010 | Takagawa et al. | 60/602 |
| 2011/0167816 A1 * | 7/2011 | Tomita et al. | 60/602 |
| 2012/0090320 A1 * | 4/2012 | Kuhlbach et al. | 60/611 |
| 2014/0127002 A1 * | 5/2014 | Joergl et al. | 415/145 |

FOREIGN PATENT DOCUMENTS

| | | |
|---|---|---|
| EP | 0864737 A1 | 9/1998 |
| EP | 1384857 A2 | 1/2004 |
| EP | 2241734 A1 | 10/2010 |
| FR | 2945577 A1 | 11/2010 |
| WO | 2008083769 A1 | 7/2008 |

* cited by examiner

SUPERCHARGED INTERNAL COMBUSTION ENGINE HAVING TWO TURBINES, AND METHOD FOR OPERATING AN INTERNAL COMBUSTION ENGINE OF SAID TYPE

RELATED APPLICATIONS

This application claims priority to European Patent Application number 11176370.2, filed on Aug. 3, 2011, the entire contents of which have been incorporated herein by reference for all purposes.

FIELD

The disclosure relates to a supercharged internal combustion engine having at least one cylinder head and at least two turbines arranged in series. The disclosure also relates to a method for operating an internal combustion engine of said type.

BACKGROUND AND SUMMARY

Within the context of the present disclosure, the expression "internal combustion engine" encompasses in particular spark-ignition engines, but also diesel engines and also hybrid internal combustion engines.

An internal combustion engine of the stated type has a cylinder block and at least one cylinder head which are connected to one another at an assembly surface to form the at least two cylinders. To hold the pistons or the cylinder liners, the cylinder block has a corresponding number of cylinder bores. The pistons are guided in the cylinder liners in an axially movable fashion and form, together with the cylinder liners and the cylinder head, the at least two cylinders of the internal combustion engine.

The at least one cylinder head conventionally serves to hold the valve drive. In order to control the charge exchange, an internal combustion engine requires control elements, for example lifting valves, and actuating devices for actuating the control elements. During the charge exchange, the combustion gases are discharged via the outlet openings and the combustion chamber is charged, that is to say the fresh mixture or the charge air is inducted, via the inlet openings. The valve actuating mechanism required for the movement of the valves, including the valves themselves, is referred to as the valve drive.

It is the object of the valve drive to open and close the inlet and outlet openings of the cylinders at the correct times, with a fast opening of the largest possible flow cross sections being sought in order to keep the throttling losses in the inflowing and outflowing gas flows low and in order to ensure the best possible charging of the cylinders with fresh mixture, and an effective, that is to say complete, discharge of the exhaust gases. The cylinders are therefore also often and increasingly equipped with two or more inlet and outlet openings.

The outlet openings of the cylinders lead to an exhaust passage, where the exhaust may be conducted through one or more aftertreatment devices before reaching the atmosphere. Additionally, one or more turbochargers may be arranged in the exhaust passage in order to utilize the energy from the exhaust to drive a compressor for compressing the intake air.

Supercharged internal combustion engines are often equipped with a plurality of exhaust-gas turbochargers in order to improve the torque characteristics of the internal combustion engine. The reasoning behind this measure is that, when using a single turbocharger, a significant torque drop can be observed when a certain rotational speed is undershot.

Said torque drop is understandable if one takes into consideration that the charge pressure ratio is dependent on the turbine pressure ratio. If, for example in a diesel engine, the engine speed is reduced, or, in a spark-ignition engine, the load or engine speed is reduced, this leads to a lower exhaust-gas mass flow, which results in a lower turbine pressure ratio and therefore in a lower charge pressure ratio. This is equivalent to a torque drop.

The drop in charge pressure can basically be counteracted by decreasing the size of the turbine cross section. If the exhaust-gas mass flow exceeds a threshold value, at least a part of the exhaust-gas flow is, within the course of the so-called exhaust-gas blow-off, conducted via a bypass line past the turbine. Said approach however has the disadvantage that the supercharging behavior is unsatisfactory at relatively high rotational speeds.

It may therefore be advantageous to provide a plurality of turbines. By connecting two exhaust-gas turbochargers in series, of which one exhaust-gas turbocharger serves as a high-pressure stage and one exhaust-gas turbocharger serves as a low-pressure stage, the compressor characteristic map can advantageously be expanded, specifically both in the direction of smaller compressor flows and also in the direction of larger compressor flows.

In particular, with the exhaust-gas turbocharger which serves as a high-pressure stage, it is possible for the surge limit to be shifted in the direction of smaller compressor flows, as a result of which high charge pressure ratios can be obtained even with small compressor flows, which considerably improves the torque characteristic in the lower part-load range. This is achieved by designing the high-pressure turbine for small exhaust-gas mass flows and by providing a bypass line by means of which exhaust gas can be conducted past the high-pressure turbine. For this purpose, the bypass line branches off from the overall exhaust line upstream of the high-pressure turbine, also referred to hereinafter as small turbine, and opens into the overall exhaust line again downstream of said small turbine and upstream of the low-pressure turbine, also referred to hereinafter as large turbine, wherein it is preferable for a control element to be provided in order to control the exhaust-gas flow conducted past the high-pressure turbine.

Two series-connected exhaust-gas turbochargers also offer further advantages. The power boost through supercharging can be further increased. Furthermore, the response behavior of an internal combustion engine supercharged in this way is considerably improved—in particular in the part-load range—in relation to a similar internal combustion engine with single-stage supercharging. The reason for this is that the rotor of a smaller-dimensioned exhaust-gas turbocharger can be accelerated more quickly, and the smaller high-pressure stage is therefore less inert than a larger exhaust-gas turbocharger used for single-stage supercharging.

In the concepts known from previous systems with two exhaust-gas turbochargers, the exhaust-gas flow is supplied, outside the cylinder head, to the small high-pressure turbine and subsequently to a low-pressure turbine arranged further downstream in the exhaust system. The length of the overall exhaust line to said second turbine is relatively large. Furthermore, the installation space may be provided for the turbines and the turbine housings and lines. In the previous systems, it is not possible to arrange both turbines in series and simultaneously close to the engine.

A further problem is the high production costs for the turbines, which additionally increase owing to the increased material outlay in the case of multiple turbines. The often nickel-containing material used for the thermally highly loaded turbine housing is relatively expensive, in particular in comparison with the material preferably used for the cylinder head, for example aluminum. Not only the material costs themselves but also the costs for the machining of said materials used for the turbine housing are relatively high.

With regard to costs, it would be advantageous to use less expensive materials, for example aluminum. The use of aluminum would also be advantageous with regard to the weight of the turbine.

To be able to use cheaper materials for producing the turbine, according to the previous systems, the turbine is provided with a cooling arrangement, for example with a liquid cooling arrangement, which significantly reduces the thermal loading of the turbine and of the turbine housing by the hot exhaust gases and therefore permits the use of thermally less highly loadable materials.

In general, the turbine housing is provided with a coolant jacket in order to form the cooling arrangement. The previous systems include both concepts in which the housing is a cast part and the coolant jacket is formed, during the casting process, as an integral constituent part of a monolithic housing, and also concepts in which the housing is of modular construction, wherein during assembly a cavity is formed which serves as a coolant jacket.

A turbine designed according to the latter concept is described for example in the German laid-open specification DE 10 2008 011 257 A1. A liquid cooling arrangement of the turbine is formed by virtue of the actual turbine housing being provided with a casing, such that a cavity into which coolant can be introduced is formed between the housing and the at least one casing element arranged spaced apart therefrom. The housing which is expanded by the casing arrangement then encompasses the coolant jacket.

EP 1 384 857 A2 likewise discloses a turbine whose housing is equipped with a coolant jacket. DE 10 2007 017 973 A1 describes a construction kit for forming a vapor-cooled turbine casing.

On account of the high specific heat capacity of a liquid, in particular of water which is conventionally used, large amounts of heat can be extracted from the housing by means of liquid cooling. The heat is dissipated to the coolant in the interior of the housing and is discharged with the coolant. The heat which is dissipated to the coolant is extracted from the coolant again in a heat exchanger.

It is basically possible for the liquid cooling arrangement of the turbine to be equipped with a separate heat exchanger or else—in the case of a liquid-cooled internal combustion engine—for the heat exchanger of the engine cooling arrangement, that is to say the heat exchanger of a different liquid cooling arrangement, to be used for this purpose. The latter merely requires corresponding connections between the two circuits.

It may however be taken into consideration in this context that the amount of heat to be absorbed by the coolant in the turbine may amount to 40 kW or more if thermally less highly loadable materials such as aluminum are used to produce the housing. It has proven to be problematic, and in some cases not practicable, for such a large amount of heat to be extracted from the coolant, and discharged to the environment by means of an air flow, in the heat exchanger.

The cooling circuit of the internal combustion engine would have to be designed for the greatly increased demand for heat dissipation, that is to say the heat exchanger would have to be of considerably larger dimensions. This is opposed by the restricted space availability in the front end region of the vehicle, where the various heat exchangers are generally arranged. Furthermore, a more powerful fan would have to be provided in order to increase the heat transfer at the heat exchanger.

The use of thermally less highly loadable and therefore cheaper materials necessitates—as explained—a multiplicity of modifications, which in turn entail costs. In this respect, the described approach leads to a conflict in which the cost saving attained by changing the material of the turbines is consumed by the increased costs of a more powerful cooling arrangement.

Against the background of that stated above, embodiments for supercharged engines are provided. In one example embodiment, a supercharged internal combustion engine comprises at least one cylinder head having at least two cylinders, with each cylinder having at least one outlet opening for discharging exhaust gases and each outlet opening being adjoined by an exhaust line, and in which exhaust lines of at least two cylinders merge, to form an overall exhaust line, within the cylinder head so as to form an integrated exhaust manifold; at least two turbines arranged in series, the two turbines being of different size and arranged downstream of the exhaust manifold in the overall exhaust line; a distributor housing in which the overall exhaust line downstream of the manifold enters into and leads through said distributor housing and to a small turbine of the two turbines; and a first turbine housing which accommodates the small turbine including at least one coolant jacket in order to form a liquid cooling arrangement.

In this way, a multi-stage turbocharger arrangement may be provided which is lower in cost in relation to the previous systems and in which both turbines can be arranged close to the engine.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
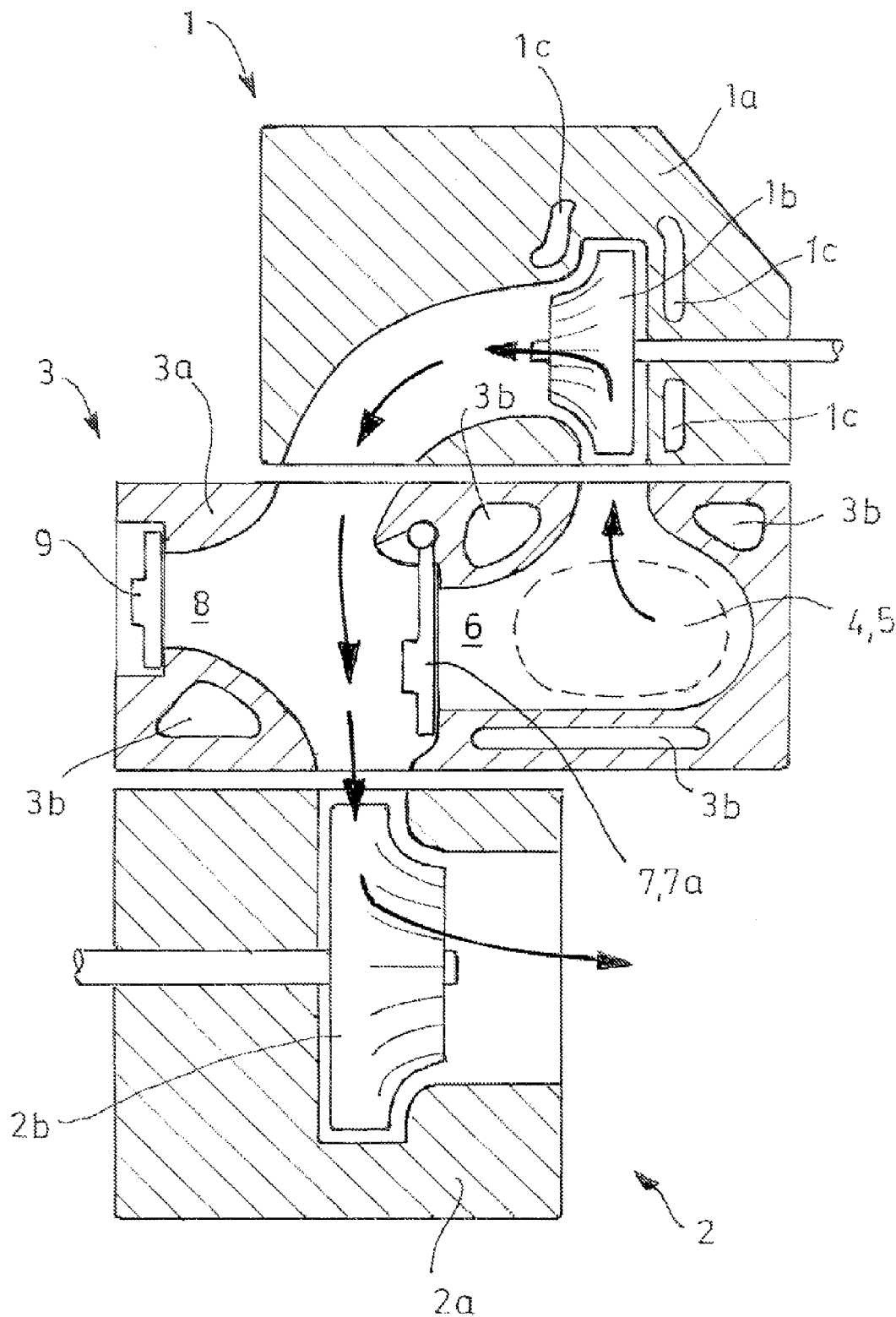
FIG. 1 shows, in cross section, a part of the exhaust system of a first embodiment of the internal combustion engine with a control element situated in the closed position.

In order to obtain efficient operation of a turbocharger across all areas of the engine speed-load map, multiple turbochargers may be arranged in series. However, the additional turbine increases the length of the path the exhaust travels before reaching the aftertreatment devices, potentially cooling the exhaust and reducing the efficiency of the aftertreatment devices. According to embodiments disclosed herein, at least two turbochargers may be arranged in series and coupled to an exhaust manifold which is integrated in the cylinder head of the engine. Thus, the turbochargers may be closely arranged to the engine.

According to typical systems, the exhaust lines which adjoin the outlet openings of the engine cylinders are at least partially integrated in the cylinder head. In the present case, the exhaust lines of at least two cylinders are merged, to form an overall exhaust line, within the cylinder head so as to form at least one integrated exhaust manifold. The merging of exhaust lines to form an overall exhaust line is referred to generally, and within the context of the present disclosure, as an exhaust manifold. An integrated manifold permits a very compact design of the internal combustion engine. The overall length of the exhaust lines of the manifold is shortened considerably, which yields further advantages, in particular with regard to supercharging.

Downstream of the exhaust manifold, the exhaust gases are supplied to at least one turbine of an exhaust-gas turbocharger. When using an exhaust-gas turbocharger, it is fundamentally sought to arrange the turbine of the charger as close to the engine, that is to say to the outlet openings of the cylinder, as possible in order thereby to be able to optimally utilize the exhaust-gas enthalpy of the hot exhaust gases, which is determined significantly by the exhaust-gas pressure and the exhaust-gas temperature, and to ensure a fast response behavior of the turbocharger. Furthermore, the path of the hot exhaust gases to the different exhaust-gas aftertreatment systems should also be as short as possible such that the exhaust gases are given little time to cool down and the exhaust-gas aftertreatment systems reach their operating temperature or light-off temperature as quickly as possible, in particular after a cold start of the internal combustion engine.

The thermal inertia of the part of the exhaust lines situated between the outlet opening at the cylinder and the turbine, or between the outlet opening at the cylinder and the exhaust-gas aftertreatment system, should therefore also be as low as possible, which can be obtained by reducing the mass and the length of the corresponding parts.

To achieve said aims, it is expedient for the exhaust lines—as in the internal combustion engine according to the disclosure—to merge within the cylinder head so as to form at least one integrated exhaust manifold. The length of the exhaust lines is reduced as a result of the integration, as a result of which not only is the thermal inertia of the exhaust system upstream of a turbine which is provided in the overall exhaust line reduced, but rather the line volume, that is to say the exhaust-gas volume, of the exhaust lines upstream of the turbine is also reduced. This improves the response behavior of the turbine and the enthalpy of the exhaust gases at the inlet into the turbine is increased.

While a single turbine may easily be positioned close to the engine as a result of integration of the manifold, a problem in the previous systems has however proven to be arranging a plurality of turbines close to the engine simultaneously, for example if, as in the internal combustion engine which is the subject matter of the present disclosure, two turbines which are arranged in series are provided downstream of the integrated exhaust manifold in the overall exhaust line.

Where the present disclosure refers to two exhaust-gas turbochargers connected in series, this means that the two associated turbines are connected in series. The compressors are preferably also connected in series, though may also be arranged parallel. In the case of turbines arranged in series, it has proven to be problematic, as already mentioned, to arrange both turbines close to the engine. To arrange both turbines close the engine, a distributor housing may be coupled to the exhaust manifold and both turbines.

Embodiments are advantageous in which the distributor housing comprises a control element which, in an open position, opens up a bypass line bypassing the small turbine and which, in a closed position, blocks said bypass line, wherein the bypass line opens into the overall exhaust line upstream of the large turbine.

According to the disclosure, the exhaust gas is supplied, outside the at least one cylinder head, not directly to the small high-pressure turbine but rather to a distributor housing from which the exhaust gas can be supplied both directly to the small high-pressure turbine and also, if the small turbine is deactivated by opening the control element, via the bypass line—bypassing the high-pressure turbine—directly to the large low-pressure turbine. The use of a distributor housing thus makes it possible for both turbines to be arranged close to the engine.

In the context of the present disclosure, the expressions "high-pressure turbine" and "low-pressure turbine" will be adhered to, specifically even if the small high-pressure turbine is deactivated by opening the control element and the exhaust gas is supplied directly to the low-pressure turbine, that is to say only one stage of the exhaust-gas turbocharging is active.

Here, embodiments are advantageous in which the turbine housings of the two turbines are arranged on opposite sides of the distributor housing, for example the housing of the large turbine is arranged on that side of the distributor housing which faces towards the cylinder block, and the small turbine, that is to say the first turbine housing, is arranged on the opposite side of the distributor housing which faces away from the cylinder block.

The internal combustion engine according to the disclosure has proven to be particularly advantageous in operating states in which the small turbine is deactivated, that is to say switched off, by virtue of the control element being opened, and the exhaust gas is supplied via the bypass line, bypassing the small turbine, directly to the large turbine. Owing to the use of a distributor housing, the length of the overall exhaust line to the large turbine when the high-pressure turbine is deactivated is relatively short. This is contributed to in particular by the bypass line being integrated in the compressor housing. By opening the bypass line, the small turbine is deactivated and the manifold is short-circuited to the inlet region into the low-pressure turbine.

In the case of low exhaust-gas quantities, that is to say low rotational speeds or low loads, the exhaust gas preferably passes through both turbines, that is to say all of the exhaust gas is supplied, with the bypass line closed, that is to say with the control element situated in the closed position, firstly to the small turbine in order to generate the desired charge pressure. Downstream of the small turbine, the exhaust-gas flow is then conducted through the large low-pressure turbine. Here, the focus is not on the participation of the low-pressure turbine in the generation of the charge pressure. It is rather the intention to maintain the rotational movement of the rotor of the large turbine. In this way, the response behavior of the exhaust-gas turbocharging arrangement is improved, because the rotor of the large turbine is already in rotational motion when, toward relatively high exhaust-gas quantities, the low-pressure turbine is used to an increasing extent for generating the charge pressure and the rotor is to be accelerated.

With increasing exhaust-gas quantity, that is to say increasing rotational speed or load, the small turbine is deactivated by virtue of the bypass line being opened. The exhaust gas then flows, with the bypass line open, that is to say with the control element situated in the open position, preferably only through the large turbine. In said switching state, under some circumstances or without further measures, a residual exhaust-gas flow also possibly flows through the small turbine and keeps the rotor in rotation. Nevertheless, within the context of the present disclosure, the small turbine is referred to even then as being deactivated.

Embodiments are however also advantageous in which the control element, when situated in the open position, blocks or closes off the overall exhaust line downstream of the small turbine.

The control element may however also be used to realize any desired distribution of the exhaust-gas flow between the two turbines. For this purpose, the control element can preferably be adjusted in a continuously variable fashion, wherein it permits a variation of the partial exhaust-gas flows supplied to the two turbines. The arrangement of the control element in the distributor housing is advantageous because no additional installation space is taken up in the engine bay by the control element. The integration of the control element into the housing permits the use of a control element without an additional space requirement.

The selection of the materials for producing the turbine housing or the provision of a cooling arrangement for the turbines or else the omission of a cooling arrangement is carried out according to the disclosure in a suitable manner corresponding to the above-described operation of the internal combustion engine and with regard to the object to be achieved.

According to the disclosure, the first turbine housing which accommodates the small turbine is equipped with at least one coolant jacket in order to form a liquid cooling arrangement. The liquid cooling arrangement significantly reduces the thermal loading of the turbine or of the turbine housing by the hot exhaust gases, such that inexpensive materials can be used for producing the first turbine housing. Here, the amounts of heat to be dissipated from the housing by means of coolant can generally be dealt with using the existing liquid cooling arrangement of the internal combustion engine, because the small turbine is traversed by only small exhaust-gas quantities which subject the associated housing to less intense thermal loading, or the small turbine is activated, and acted on by hot exhaust gas, only at low exhaust-gas quantities. The amounts of heat to be dissipated are low, corresponding to the low exhaust-gas quantities.

The liquid cooling of the small turbine permits a free material selection, and thus the use of inexpensive materials of low weight.

As explained, by means of the internal combustion engine according to the disclosure, the first object on which the disclosure is based, specifically that of providing a supercharged internal combustion engine which is less expensive in relation to the previous systems and in which both turbines can be arranged close to the engine, is achieved.

The at least one cylinder head of the internal combustion engine according to the disclosure has at least one integrated exhaust manifold, that is to say if appropriate also two or three integrated manifolds.

Embodiments of the cylinder head having for example four cylinders in an in-line arrangement, in which the exhaust lines of the outer cylinders and the exhaust lines of the inner cylinders are merged in each case to form one overall exhaust line, are likewise cylinder heads according to the disclosure.

This is also true of embodiments in which the exhaust lines of the inner cylinders merge, to form an overall exhaust line, within the cylinder head so as to form an integrated exhaust manifold, and the outer cylinders are in each case equipped with an individual separate exhaust line. This is also true of embodiments in which in each case the exhaust lines of an outer cylinder and the exhaust lines of the adjacent inner cylinder merge, to form an overall exhaust line, within the cylinder head so as to form an integrated exhaust manifold, wherein the two integrated exhaust manifolds formed in this way exit the cylinder head through two outlet openings.

Embodiments are also advantageous in which the exhaust lines of all the cylinders of the cylinder head are merged within the cylinder head to form a single, that is to say common overall exhaust line.

Embodiments of the internal combustion engine are advantageous in which the second turbine housing, which accommodates the large turbine, is not equipped with a liquid cooling arrangement. Using a liquid cooling arrangement to dissipate the amount of heat which would be incurred in the low-pressure turbine in the case of high exhaust-gas quantities would necessitate a corresponding cooling system, that is to say a cooling system modified in relation to a conventional internal combustion engine, for which reason it is advantageous to dispense with the provision of a liquid cooling arrangement in the second turbine. Then, owing to the lack of a cooling arrangement, a thermally more highly loadable material is used to produce the housing of the large turbine.

Embodiments of the internal combustion engine are advantageous in which at least parts of the distributor housing and parts of the first turbine housing are configured integrally and form a monolithic component. Embodiments of the internal combustion engine are advantageous in particular in which the distributor housing and the first turbine housing are configured integrally and form a monolithic component.

In principle, as a result of the single-piece design, the requirement for a gas-tight, thermally highly loadable and expensive connection between the distributor housing and turbine housing is eliminated, which offers cost advantages. There is also no risk of exhaust gas escaping into the environment as a result of a leak.

It is possible to realize a particularly close-coupled arrangement of the first turbine because it is no longer necessary to provide access for assembly tools, which simplifies the structural design both of the turbine housing and also of the distributor housing and permits optimization with regard to the operation of the turbine. The two housings may be of comparatively small-volume design and the rotor of the small turbine may be arranged close to the inlet region or to the manifold, which is not directly possible if assembly access is allowed.

If the turbine housing and the distributor housing are liquid-cooled, and if the coolant jacket which is integrated in the turbine housing is to be connected to the coolant jacket of the distributor housing and if appropriate supplied with coolant via the distributor housing, a connection of the two cooling circuits or cooling jackets by means of external lines is no longer necessary owing to the at least partially integral configuration of the housing.

Here, a coolant jacket which is integrated in the distributor housing may also serve to concomitantly form the coolant jacket which is provided in the housing, such that a connection of two originally independent coolant jackets in the actual sense is no longer present, or no longer be formed. With regard to the coolant circuits or the connection of the coolant jackets and the leakage of coolant, that which has already been stated with regard to the exhaust-gas flow applies analogously. Furthermore, the integration of the line leads to a reduction in the number of components and to a more compact design. The assembly time is shortened considerably.

The monolithic component is advantageously formed as a cast component, preferably from aluminum, resulting in a particularly significant weight saving in relation to the use of steel. The costs for the machining of the aluminum housing are likewise lower.

The monolithic component may nevertheless also be produced from cast iron or other cast materials. This is because the advantages of a monolithic design according to the embodiment in question, for example the compact design and the weight and installation space saving as a result of the omission of the superfluous connections and connecting elements, are maintained regardless of the material which is used.

Embodiments of the internal combustion engine are advantageous in which the distributor housing and the first turbine housing are separate components which are connected to one another in a non-positively locking, positively locking and/or cohesive fashion.

A modular design in which the first turbine or the first turbine housing and the distributor housing are separate components and are connected to one another during assembly has the advantage that firstly the turbine may be combined with other distributor housings and secondly the distributor housing may be combined with other turbines according to the modular design principle. The versatile applicability of a component generally increases the quantities produced, as a result of which the unit costs are reduced. The costs which arise if the turbine or the distributor housing may be exchanged, that is to say replaced, as a result of a defect are also reduced.

Furthermore, a modular design permits the use of different materials for the two housings, as a result of which different levels of thermal loading of the housing can be allowed for. This is of high relevance in particular if only one of the two housings is equipped with a liquid cooling arrangement.

If, by means of the liquid cooling arrangement of the turbine housing, the first housing part which accommodates the smaller turbine is not cooled to an extent that makes it possible to dispense with the use of thermally highly loadable material for producing said housing part, it is possible, owing to the modular design, for at least the second, larger housing part to be produced from a thermally less highly loadable and therefore less expensive material.

Embodiments of the internal combustion engine are advantageous in which the distributor housing is equipped with at least one coolant jacket in order to form a liquid cooling arrangement.

The liquid cooling arrangement reduces the thermal loading of the distributor housing, such that cheap materials can be used for producing the distributor housing. Also, the thermal loading of the control element is reduced by the liquid cooling arrangement of the distributor housing, such that it is likewise possible to dispense with the use of expensive heat-resistant materials for forming the control element. The reduction of the thermal loading furthermore reduces the susceptibility of the control element to degradation, for example the jamming of a flap which serves as a control element.

In this connection, embodiments of the internal combustion engine are advantageous in which the at least one coolant jacket of the distributor housing is connected to the at least one coolant jacket of the first turbine housing.

A connection of the two coolant circuits or coolant jackets makes it possible for both circuits to be equipped with a common pump and a common heat exchanger, and in this way for the number of components and the costs to be reduced. Reference is made to the statements already made above with regard to the interaction of distributor housing and first turbine housing.

Embodiments of the internal combustion engine are advantageous in which the overall exhaust line downstream of the small turbine enters into the distributor housing again, and leads through said distributor housing and to the large turbine. Said measure assists the realization of a compact design and in particular the integration of the bypass line into the distributor housing as per the embodiment below.

Specifically, embodiments of the internal combustion engine are advantageous in which the bypass line is integrated completely into the distributor housing. This measure, too, assists the realization of a compact design and ensures short lines, which further shortens the overall length of the exhaust lines, which also include the bypass line. As a result of the integration of the bypass line, a gas-tight, thermally highly loadable and therefore expensive connection between the bypass line and the overall exhaust line is eliminated. This leads to cost advantages and eliminates the risk of exhaust gas undesirably escaping into the environment as a result of a leak.

Embodiments of the internal combustion engine are advantageous in which the control element is a valve, a slide, a flap or the like. Embodiments of the internal combustion engine are advantageous in particular in which the control element is a pivotable flap. With regard to the control element, embodiments may be advantageous in which the control element is electrically, hydraulically, pneumatically, mechanically or magnetically controllable, for example by means of the engine controller of the internal combustion engine or else by means of charge pressure regulation.

Embodiments are advantageous in which the control element can be switched in a two-stage fashion, which simplifies control and in particular offers cost advantages. Here, the control element is moved from the closed position, in which it blocks the bypass line, into the open position in order to deactivate the small turbine by opening up the bypass line.

To prevent an abrupt torque drop or torque increase upon the actuation of the control element, a continuously variable switching or switchover action is preferable. Embodiments are therefore also advantageous in which the control element can be adjusted in a continuously variable fashion.

Embodiments of the internal combustion engine are advantageous in which a second bypass line is provided which branches off from the overall exhaust line upstream of the large turbine. By means of the second bypass line, exhaust gas can be conducted past the large turbine.

This makes it possible for the turbines to be configured for medium exhaust-gas quantities, whereby the torque characteristic in the upper part-load range is improved. In the operating states in which the maximum exhaust-gas quantities arise, a part of the exhaust gas is then blown off.

In this connection, embodiments of the internal combustion engine are advantageous in which the second bypass line branches off from the overall exhaust line within the distributor housing. This permits the arrangement of a shut-off element in or on the distributor housing.

Specifically, embodiments of the internal combustion engine are advantageous in which a shut-off element is provided which, in an open position, opens up the second bypass line, and in a closed position, blocks said second bypass line.

Embodiments of the internal combustion engine are advantageous in which the first turbine housing and the second turbine housing are produced from different materials. Said embodiment makes allowance for the fact that the first turbine housing is, according to the disclosure, equipped with at least one coolant jacket, whereas the large turbine preferably does not have a liquid cooling arrangement.

Embodiments of the internal combustion engine are advantageous in which the at least one cylinder head is equipped with a coolant jacket. The cylinder head according to the disclosure has an integrated exhaust manifold and is therefore thermally more highly loaded than a conventional cylinder head which is equipped with an external manifold, as a result of which higher demands are placed on the cooling arrangement. Furthermore, liquid cooling of the cylinder head is also advantageous because the cylinder head of a supercharged internal combustion engine is thermally more highly loaded than the cylinder head of a conventional naturally aspirated engine.

It is fundamentally possible for the cooling arrangement to take the form of an air-cooling arrangement or a liquid-cooling arrangement. On account of the significantly higher heat capacity of liquids in relation to air, it is possible for significantly greater heat quantities to be dissipated by means of liquid cooling than is possible with air cooling.

Liquid cooling necessitates that the cylinder head be equipped with a coolant jacket, that is to say necessitates the provision of coolant ducts which conduct the coolant through the cylinder head. The heat is dissipated to the coolant, generally water provided with additives, already in the interior of the cylinder head. Here, the coolant is fed by means of a pump arranged in the cooling circuit, such that said coolant circulates in the coolant jacket. The heat dissipated to the coolant is discharged from the interior of the cylinder head in this way, and is extracted from the coolant again in a heat exchanger.

If the at least one cylinder head has a coolant jacket, embodiments are advantageous in which the at least one coolant jacket of the turbine housing and/or the at least one coolant jacket of the distributor housing is connected to the coolant jacket integrated in the cylinder head.

Embodiments of the internal combustion engine are advantageous in which each cylinder has at least two outlet openings for discharging the exhaust gases out of the cylinder. As already mentioned, during the discharge of the exhaust gases within the context of the charge exchange, it is an aim to open up the largest possible flow cross sections as fast as possible in order to ensure an effective discharge of the exhaust gases, for which reason the provision of more than one outlet opening is advantageous.

Here, embodiments are advantageous in which firstly the exhaust lines of the at least two outlet openings of each cylinder are merged to form a partial exhaust line associated with the cylinder, before the partial exhaust lines of at least two cylinders are merged to form the overall exhaust line.

The overall length of all the exhaust lines is shortened in this way. The stepped merging of the exhaust lines to form an overall exhaust line also contributes to a more compact, that is to say less voluminous design of the cylinder head, and therefore in particular to a weight reduction and more effective packaging in the engine bay.

Embodiments may however also be advantageous in which each cylinder has one outlet opening for discharging the exhaust gases out of the cylinder.

Each of the two turbines which are used may be equipped with variable turbine geometry, which permits wide-ranging adaptation to the respective operating point of the internal combustion engine by means of an adjustment of the turbine geometry or of the effective turbine cross section. Here, guide blades for influencing the flow direction are arranged upstream of the rotor of the turbine. In contrast to the guide blades of the rotating rotor, the guide blades do not rotate with the shaft of the turbine, that is to say with the rotor. The guide blades are duly arranged so as to be stationary but not so as to be completely immovable, rather so as to be rotatable about their axes such that the flow approaching the guide blades can be influenced.

In contrast, if a turbine has a fixed, invariable geometry, the guide blades are arranged not only so as to be stationary but rather also so as to be completely immovable, that is to say rigidly fixed.

FIG. 1 shows, in cross section, a part of the exhaust system of a first embodiment of the internal combustion engine with a control element 7 situated in the closed position. The exhaust lines of the cylinders merge, to form an overall exhaust line 5, within the cylinder head so as to form an integrated exhaust manifold 4.

The overall exhaust line 5 emerging from the cylinder head enters, downstream of the manifold 4, into the housing 3a of a distributor 3, from which the exhaust gas can be distributed between two turbines 1, 2 of different size, wherein the turbines 1, 2 are or can be arranged in series.

The overall exhaust line 5 leads through the distributor housing 3a to the small turbine 1. For this purpose, the overall exhaust line 5 passes from the distributor housing 3a into the first turbine housing 1a which accommodates the rotor 1b of the small turbine 1. Downstream of the small turbine 1, the overall exhaust line 5 enters into the distributor housing 3a again. The exhaust gas is conducted via the overall exhaust line 5 through the distributor housing 3a and into a second turbine housing 2a which accommodates the rotor 2b of the large turbine 2. In the present case, the three housings 1a, 2a, 3a form separate components which are connected to one another. To illustrate this, the housings 1a, 2a, 3a are illustrated so as to be slightly spaced apart at their assembly surfaces.

A flap 7a which serves as a control element 7 is arranged in the distributor housing 3a, which flap is pivotable and opens up and blocks the bypass line 6 which bypasses the small turbine 1. FIG. 1 shows the internal combustion engine with the flap 7a situated in the closed position. In the illustrated switching state of the flap 7a, the exhaust gas flows both through the small high-pressure turbine 1 and also through the large low-pressure turbine 2.

A second bypass line 8 serves for the blow-off of exhaust gas at the large second turbine 2, for which purpose the second bypass line 8 branches off from the overall exhaust line 5 upstream of the large turbine 2. The second bypass line 8 branches off from the overall exhaust line 5 within the distributor housing 3a. A shut-off element 9 is provided in order, in an open position, to open up the second bypass line 8 and, in a closed position, to block the second bypass line 8.

Both the first turbine housing 1a and also the distributor housing 3a are equipped with at least one coolant jacket 1c, 3b in order to form a liquid cooling arrangement. The liquid cooling arrangement reduces the thermal loading of the housings 1c, 3b by the hot exhaust gases, such that cheap materials can be used for producing said housings.

Figure 2:
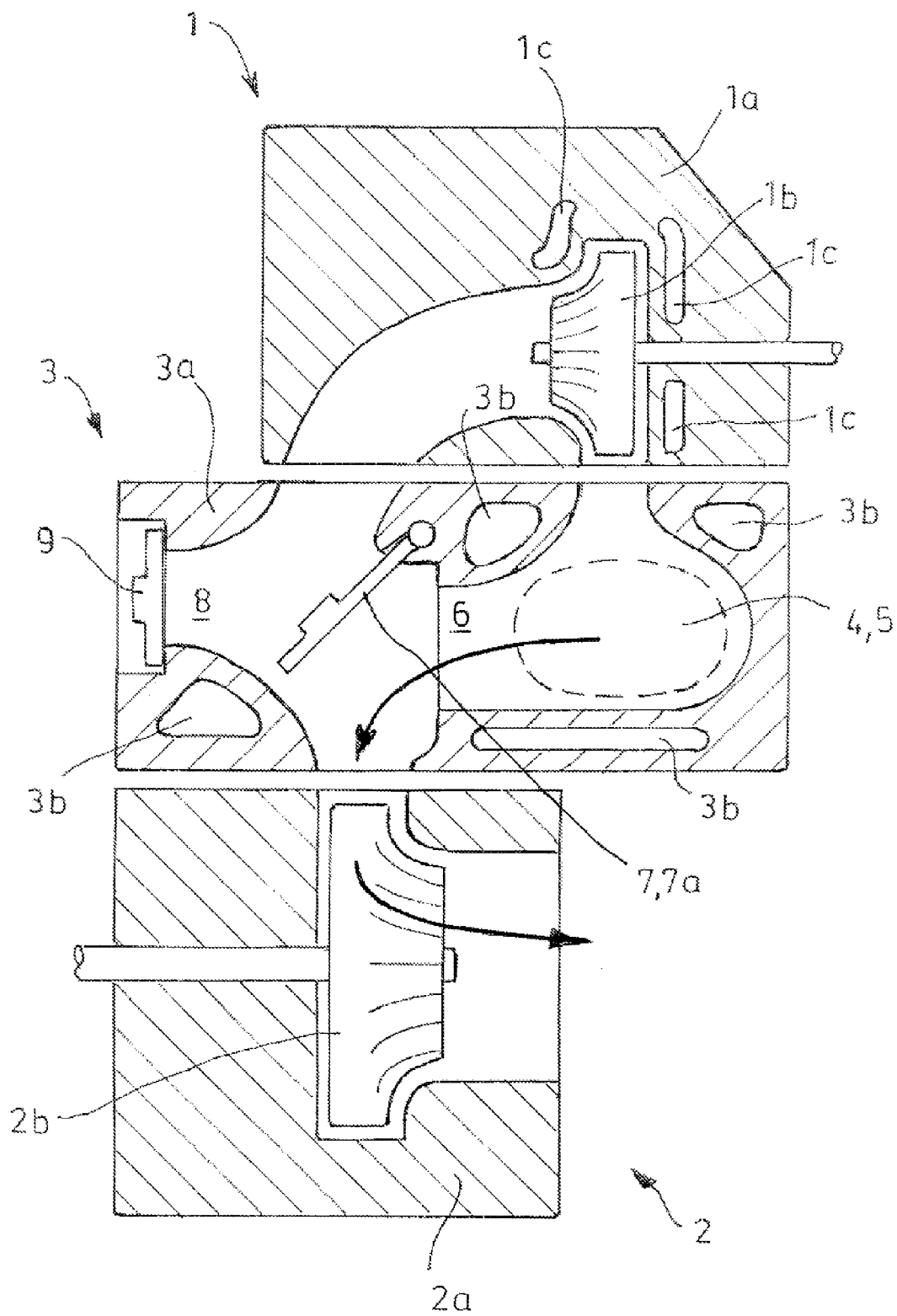
FIG. 2 shows, in cross section, the embodiment of the internal combustion engine illustrated in FIG. 1, with a control element situated in the open position.

FIG. 2 shows, in cross section, the embodiment of the internal combustion engine illustrated in FIG. 1, with the control element 7 situated in the open position. It is sought merely to explain the additional features in relation to FIG. 1, for which reason reference is made otherwise to FIG. 1 and the associated description. The same reference symbols are used for the same components.

If the exhaust-gas quantity exceeds a predefinable exhaust-gas quantity, the bypass line 6 is opened up by virtue of the flap 7a being pivoted, and the small turbine 1 is deactivated. In the embodiment illustrated in FIG. 2, the flap 7a, in the open position, does not completely block the overall exhaust line 5 downstream of the small turbine 1.

The bypass line 6 opens out into the overall exhaust line 5 upstream of the large turbine 2, such that the exhaust gas conducted past the small turbine 1 can be conducted through the large turbine 2.

Figure 3:
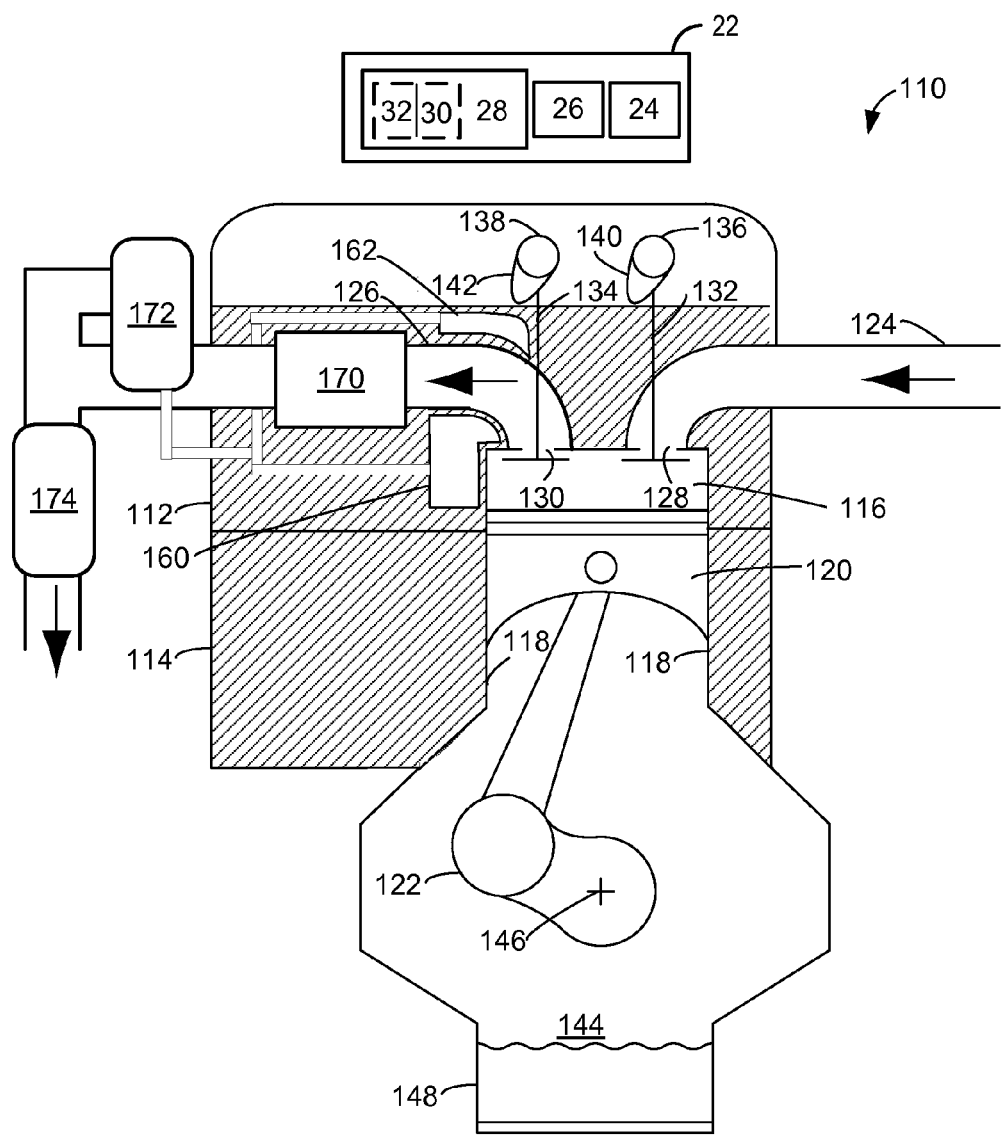
FIG. 3 schematically shows a single cylinder of a multi-cylinder engine including the turbocharger configuration illustrated in FIGS. 1 and 2.

FIG. 3 is a schematic diagram showing one cylinder 116 of a multi-cylinder engine 110, which may be included in a propulsion system of an automobile. The engine 110 includes a cylinder head 112 and a cylinder block 114 which are connected to one another at their assembly end sides so as to form a combustion chamber. Engine 110 includes a multi-stage turbocharger, with turbines 172 and 174 depicted in FIG. 3. Turbine 172 is one non-limiting example of turbine 1, and turbine 174 is one non-limiting example of turbine 2.

Combustion chamber (i.e. cylinder) 116 of engine 110 may include combustion chamber walls 118 with piston 120 positioned therein. Piston 120 may be coupled to crankshaft 122 so that reciprocating motion of the piston is translated into rotational motion of the crankshaft. Crankshaft 122 may be coupled to at least one drive wheel of a vehicle via an intermediate transmission system. Further, a starter motor may be coupled to crankshaft 122 via a flywheel to enable a starting operation of engine 110.

Combustion chamber 116 may receive intake air from an intake manifold (not shown) via intake line, or intake passage, 124 and may exhaust combustion gases via exhaust line, or exhaust passage, 126. Exhaust passage 126 may be coupled to an exhaust manifold 170, which in the depicted embodiment is integrated into cylinder head 112. Intake passage 124 and exhaust passage 126 can selectively communicate with combustion chamber 116 via inlet opening 128 and outlet opening 130 and respective intake valve 132 and exhaust valve 134. In some examples, combustion chamber 116 may include two or more intake valves and/or two or more exhaust valves.

During operation, each cylinder within engine 110 typically undergoes a four stroke cycle: the cycle includes the intake stroke, compression stroke, expansion stroke, and exhaust stroke. During the intake stroke, generally, the exhaust valve 134 closes and intake valve 132 opens. Air is introduced into combustion chamber 116 via intake passage 124, and piston 120 moves to the bottom of the cylinder so as to increase the volume within combustion chamber 116. The position at which piston 120 is near the bottom of the cylinder and at the end of its stroke (e.g. when combustion chamber 116 is at its largest volume) is typically referred to by those of skill in the art as bottom dead center (BDC). During the compression stroke, intake valve 132 and exhaust valve 134 are closed. Piston 120 moves toward the cylinder head so as to compress the air within combustion chamber 116. The point at which piston 120 is at the end of its stroke and closest to the cylinder head (e.g. when combustion chamber 116 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as a spark plug (not shown), resulting in combustion. During the expansion stroke, the expanding gases push piston 120 back to BDC. Crankshaft 122 converts piston movement into a rotational torque of the rotary shaft. Finally, during the exhaust stroke, the exhaust valve 134 opens to release the combusted air-fuel mixture to exhaust passage 126 and the piston returns to TDC. Note that the above is shown merely as an example, and that intake and exhaust valve opening and/or closing timings may vary, such as to provide positive or negative valve overlap, late intake valve closing, or various other examples.

A valve actuating device depicted in FIG. 3 comprises two camshafts 136 and 138, on which a multiplicity of cams 140, 142 are arranged. A basic distinction is made between an underlying camshaft and an overhead camshaft. This relates to the parting plane, that is to say assembly surface, between the cylinder head and cylinder block. If the camshaft is arranged above said assembly surface, it is an overhead camshaft, otherwise it is an underlying camshaft. Overhead camshafts are preferably mounted in the cylinder head, and are depicted in FIG. 3.

The cylinder head 112 is connected, at an assembly end side, to a cylinder block 114 which serves as an upper half of a crankcase 144 for holding the crankshaft 122 in at least two bearings, one of which is depicted as crankshaft bearing 146. At the side facing away from the cylinder head 112, the cylinder block 114 is connected to an oil pan 148 which serves as a lower crankcase half and which is provided for collecting and storing engine oil.

The heat released during combustion by the exothermic chemical conversion of the fuel is dissipated in part to the cylinder head 112 and the cylinder block 114 via the walls bounding the combustion chamber 116 and in part to the adjoining components and the environment via the exhaust gas flow. To reduce the thermal stress on the cylinder head 112, some of the heat flow introduced into the cylinder head 112 may be removed from the cylinder head 112 again.

Thus, cylinder head 112 may include one or more coolant jackets 160, 162. As depicted in FIG. 3, lower coolant jacket 160 is located between exhaust passage 126 and the assembly end side of cylinder head 112, while upper coolant jacket 162 is located on the opposite side of exhaust passage 126 from coolant jacket 160. As shown, coolant jacket 160 is coupled coolant jacket 162 via a flow passage, which in turn is coupled to turbocharger turbine 172 in order to provide coolant flow to the turbocharger. Turbine 172 may include a housing which accommodates the turbine. The housing may include at least one coolant jacket in order to form a liquid cooling arrangement. Thus, coolant may be routed through at least one coolant jacket 160 arranged in an exhaust passage side of the cylinder head 112 to a coolant duct of the turbine 172. As such, turbine 172 may be water-cooled turbine. As turbine 174 does not receive coolant via the engine cooling system, turbine 174 may be referred to as a non-water cooled turbine.

As shown in FIG. 3, turbine 172 is coupled to cylinder head 112 on an outside of the cylinder head 112. However, in some embodiments, turbine 172 may be integrated in cylinder head 112. While not depicted in FIG. 3, air flow through the turbines 172 and 174 may be regulated via a control element located in a bypass line between the turbines, as explained above with respect to FIGS. 1 and 2.

A control system 22 may regulate various aspects of the engine 110. The control system 22 includes, in particular, a processor 24, a memory 26, and a control unit 28, the processor 24 being set up to execute the methods described herein. In addition, the control system 22 includes suitable inputs 30 for capturing input variables, such as the rotational speed and the load of the internal combustion engine, and/or the rotational speeds of the turbines 172, 174. Furthermore, the control system 22 includes outputs 32 for activating various actuating elements, such as the control element (e.g., element 7) between the two turbines. The control system 22 may be, in particular, a part of an electronic engine management system.

Thus, the systems presented above provide for an engine system comprising an exhaust manifold integrated in a cylinder head, a distributor housing fluidically coupled to the exhaust manifold and leading to a smaller first turbine and a larger second turbine, the first and second turbines arranged in series, and a control element arranged in the distributor housing. The first turbine is a water-cooled turbine and the second turbine is a non-water cooled turbine. The system also includes a controller including instructions to open the control element during high engine loads and close the control element during low engine loads. When the control element is closed, exhaust is routed to the first turbine, and when the control element is open, exhaust is routed to the second turbine.

Figure 4:
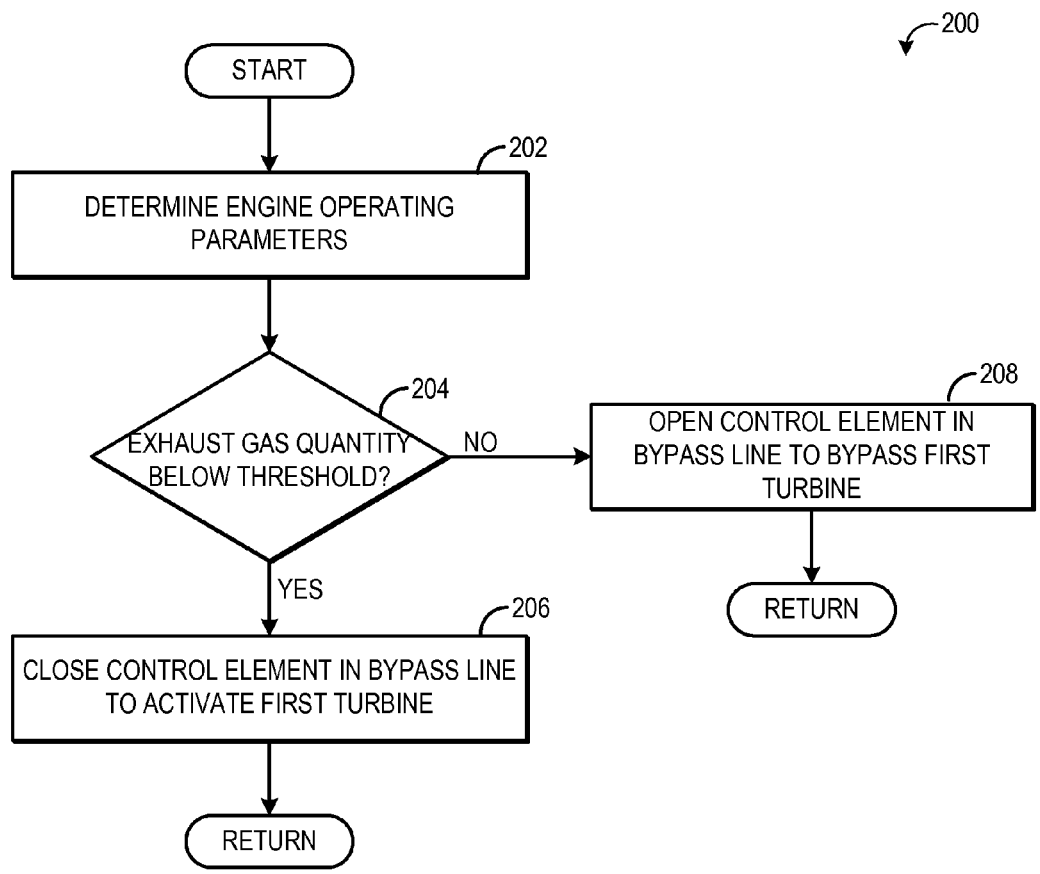
FIG. 4 is a flow chart illustrating a method for controlling air flow through a multi-stage turbocharger system according to an embodiment of the present disclosure.

Turning now to FIG. 4, a method 200 for controlling air flow in a multi-stage turbocharger is illustrated. Method 200 may be carried out by a control system, such as control system 22, according to instructions stored thereon. Method 200 may regulate air flow through a first, smaller turbine (such as turbine 1 of FIG. 1) of the multi-stage turbocharger and a second, larger turbine (such as turbine 2 of FIG. 1) of the multi-stage turbocharger. Method 200 includes, at 202, determining engine operating parameters. The operating parameters may include engine speed, engine load, exhaust mass air flow, and other parameters.

At 204, it is determined if the exhaust gas quantity is below a threshold. The exhaust gas quantity may be the exhaust mass air flow determined above. In other embodiments, the exhaust gas quantity may be approximated based on engine speed or engine load. The threshold exhaust gas quantity may vary based on turbocharger specifications, but may be a quantity above which the first turbine loses effectiveness. In one example, the threshold may be an exhaust gas quantity produced at medium engine loads.

If the exhaust gas quantity is below the threshold, method 200 proceeds to 206 to close the control element in the bypass line in order to activate the first turbine. As explained above and in more detail below, the first turbine may be smaller than the second turbine, and may perform effectively with relatively small exhaust gas flows. Thus, the control element, which may be the control element 7 of FIG. 1, may be closed in order to route exhaust through the first turbine.

If the exhaust gas quantity is not below the threshold, method 200 proceeds to 208 to open the control element in the bypass line to bypass the first turbine. By opening the control element, the exhaust will be routed to the second turbine without passing through the first turbine. Therefore, under conditions of higher exhaust quantities, the second turbine may be activated.

Thus, the method described above provides for, from a control element being situated in the closed position in the case of low exhaust-gas flow quantities, the bypass line is opened up, by virtue of the control element being opened, when the exhaust-gas quantity exceeds a predefinable exhaust-gas quantity.

That which has been stated in connection with the internal combustion engine according to the disclosure likewise applies to the method according to the disclosure.

If the internal combustion engine according to the disclosure uses quantity regulation, in which the load is controlled by means of the quantity of fresh mixture, the approach according to the disclosure in the operation of said internal combustion engine means that the bypass line is opened up by virtue of the control element being opened if—assuming a constant rotational speed—the load of the internal combustion engine exceeds a predefinable load, since the exhaust-gas quantity in an internal combustion engine of said type corresponds to the load, with the exhaust-gas quantity rising with increasing load and falling with decreasing load. In principle, it is also case that, at constant load, the exhaust-gas quantity increases with increasing rotational speed.

If, in contrast, the internal combustion engine is based on quality regulation, in which the load is controlled by means of the composition of the fresh mixture and the exhaust-gas quantity varies substantially with the rotational speed, then in the method according to the disclosure for operating said internal combustion engine, the bypass line is opened up by virtue of the control element being opened if the rotational speed of the internal combustion engine exceeds a predefinable rotational speed, since in the present case, the exhaust-gas quantity rises with increasing rotational speed and falls with decreasing rotational speed.

The internal combustion engine according to the disclosure is an internal combustion engine which is supercharged by means of exhaust-gas turbocharging, in which it may additionally be taken into consideration that the charge pressure on the induction side may vary with the load and/or rotational speed and likewise has an influence on the exhaust-gas quantity. The relationships presented in simplified form above between the exhaust-gas quantity and the load or rotational speed then consequently do not apply in said general form. The method according to the disclosure is therefore geared very generally to the exhaust-gas quantity and not to the load or rotational speed.

In practice, the actuation of the control element then preferably takes place as a function of the combustion air mass and of the charge pressure, because both operating variables can be easily determined or are already available and the combustion air mass differs from the exhaust-gas quantity merely by the introduced fuel quantity, which is likewise known.

In this respect, method variants are advantageous in which, proceeding from the control element being situated in the closed position in the case of low exhaust-gas flow quantities, the bypass line is opened up, by virtue of the control element being opened, when the combustion air mass exceeds a predefinable combustion air mass and/or the charge pressure exceeds a predefinable charge pressure.

Method variants are advantageous in which the bypass line is opened up, by virtue of the control element being opened, only if the exhaust-gas quantity of the internal combustion engine exceeds a predefinable exhaust-gas quantity and is greater than said predefinable exhaust-gas quantity for a predefinable time period $\Delta t_1$.

The introduction of an additional condition for the opening of the bypass line is intended to prevent an excessively frequent mode change if the exhaust-gas quantity only briefly exceeds a predefinable exhaust-gas quantity and then falls again or fluctuates around the predefinable value for the exhaust-gas quantity, without the exceedance justifying an opening of the bypass line.

A similar process is advantageously followed for the closing of the bypass line. That is to say, the bypass line is closed again when the exhaust-gas quantity falls below a predefinable exhaust-gas quantity.

Here, method variants are advantageous in which the closing is carried out when the exhaust-gas quantity falls below the predefinable exhaust-gas quantity and is lower than the predefinable exhaust-gas quantity for a predefinable time period $\Delta t2$.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine system, comprising:
    an exhaust manifold integrated in a cylinder head;
    a distributor housing fluidically coupled to the exhaust manifold and leading to a smaller first turbine and a larger second turbine, the first and second turbines arranged in series;
    a control element arranged in the distributor housing which, in an open position, opens up a bypass line bypassing the small turbine and which, in a closed position, blocks the bypass line, wherein the bypass line opens into an overall exhaust line upstream of the second turbine, and
    a second bypass line is provided which branches off from the overall exhaust line within the distributor housing and upstream of the second turbine, and
    wherein the first turbine is a water-cooled turbine and the second turbine is a non-water-cooled turbine.

2. The engine system of claim 1, further comprising a controller including instructions to open the control element during high engine loads and close the control element during low engine loads.

3. The engine system of claim 2, wherein when the control element is closed, exhaust is routed to the first turbine, and when the control element is open, exhaust is routed to the second turbine.

4. A supercharged internal combustion engine comprising:
    at least one cylinder head having at least two cylinders, with each cylinder having at least one outlet opening for discharging exhaust gases and each outlet opening being adjoined by an exhaust line;
    at least two turbines arranged in series, the two turbines being of different size and arranged downstream of an exhaust manifold in an overall exhaust line;
    a distributor housing in which the overall exhaust line downstream of the exhaust manifold enters into and leads through said distributor housing and to a small turbine of the two turbines;
    a first turbine housing which accommodates the small turbine including at least one coolant jacket in order to form a liquid cooling arrangement; and
    a second bypass line is provided which branches off from the overall exhaust line within the distributor housing and upstream of a large turbine;
    wherein the distributor housing comprises a control element which, in an open position, opens up a bypass line bypassing the small turbine and which, in a closed position, blocks said bypass line, wherein the bypass line opens into the overall exhaust line upstream of the large turbine of the two turbines.

5. The supercharged internal combustion engine as claimed in claim 4, wherein the bypass line is integrated completely into the distributor housing.

6. The supercharged internal combustion engine as claimed in claim 4, wherein the control element is a pivotable flap.

7. The supercharged internal combustion engine as claimed in claim 4, wherein a shut-off element is provided which, in an open position, opens up the second bypass line and, in a closed position, blocks said second bypass line.

8. The supercharged internal combustion engine as claimed in claim 4, wherein a second turbine housing which accommodates the large turbine is not equipped with a liquid cooling arrangement.

9. The supercharged internal combustion engine as claimed in claim 8, wherein the first turbine housing and the second turbine housing are produced from different materials.

10. The supercharged internal combustion engine as claimed in claim 4, wherein at least parts of the distributor housing and parts of the first turbine housing are configured integrally and form a monolithic component.

11. The supercharged internal combustion engine as claimed in claim 4, wherein the distributor housing and the first turbine housing are configured integrally and form a monolithic component.

12. The supercharged internal combustion engine as claimed in claim 4, wherein the distributor housing and the first turbine housing are separate components which are connected to one another in a non-positively locking, positively locking and/or cohesive fashion.

13. The supercharged internal combustion engine as claimed in claim 4, wherein the distributor housing is equipped with at least one coolant jacket in order to form a liquid cooling arrangement.

14. The supercharged internal combustion engine as claimed in claim 13, wherein the at least one coolant jacket of the distributor housing is connected to the at least one coolant jacket of the first turbine housing.

15. The supercharged internal combustion engine as claimed in claim 4, wherein the overall exhaust line downstream of the small turbine enters into the distributor housing again and leads through said distributor housing and to the large turbine.

* * * * *